Dec. 6, 1955  A. V. LOUGH  2,725,720
FLOW CONTROL DEVICE
Filed Feb. 23, 1950  2 Sheets-Sheet 1

INVENTOR.
A. VANCE LOUGH
BY WHITEHEAD & VOGL
ATTORNEYS

Dec. 6, 1955   A. V. LOUGH   2,725,720
FLOW CONTROL DEVICE
Filed Feb. 23, 1950   2 Sheets-Sheet 2

INVENTOR.
A. VANCE LOUGH
BY WHITEHEAD & VOGL

ATTORNEYS

United States Patent Office 2,725,720
Patented Dec. 6, 1955

2,725,720

FLOW CONTROL DEVICE

A. Vance Lough, Glenwood Springs, Colo.; Agnes Lough, administratrix of the estate of said A. Vance Lough, deceased Application February 23, 1950, Serial No. 145,607

9 Claims. (Cl. 61—29)

This invention relates to flow control devices and more particularly to a baffle formed as a control gate or weir used to divert flow from irrigation ditch laterals into corrugate trenches, and has as an object to provide a lightweight, easily-placed and adjustable baffle for such purposes.

Another object of this invention is to provide a baffle which may be placed in a trench and thereby control the flow therepast without erosion or washing of the soil.

Another object of this invention is to provide, in one embodiment, a control weir and calibration marks whereby an irrigator may measure flow through the ditch.

Another object of this invention is to provide a baffle which is easily installed in an irrigation ditch lateral or at the head of a corrugate row and which, once installed, may be easily adjusted to regulate flow therepast.

Another object of this invention is to provide a new and improved baffle for use in irrigation laterals and in corrugate rows from such laterals which is light in weight, easily portable.

Yet another object of this invention is to provide a baffle which is made of sheet material, with the elements of the unit arranged to provide a simple, sturdy and economical construction which may be used over a long period of time.

With these and other objects in view, all of which more fully hereinafter appear, my invention comprises certain new and novel combinations and arrangements of parts and elements as hereinafter described and defined in the appended claims and illustrated in preferred embodiment in the attached drawings in which:

In the practice of irrigation it is often desirable to flow a head of water from a lateral to a number of corrugate trenches simultaneously, whereby a large portion of a field is irrigated at the same time. Often, as many as ten or fifteen rows may be diverted from a single lateral in this manner to irrigate the field efficiently. However, in such practice one of the more difficult problems is to control the flow into each row whereby such flow remains relatively constant with respect to the flow in the adjacent rows. This problem is rendered even more difficult by the fact that earth ordinarily erodes under the effect of flowing water and, where such erosion commences in a row, that particular row may quickly take all of the water and cause flooding and even damage to that portion of the field adjacent the row, while the remainder of the field may receive no water at all. Thus, to practice this desirable method of irrigation it is necessary for an irrigator to be constantly alert and constantly adjusting the flow from the lateral into the corrugates, and it follows that a single irrigator can control only a limited number of such corrugates. While the desirability of this method of irrigation has long been recognized, the practice is not as widespread as it might be because of the difficulties encountered in controlling the flow as above stated, and with all of this in view my present invention was conceived and deevloped to provide an inexpensive and effective means for opening corrugate rows from a ditch lateral and controlling the flow into such rows, to eliminate the problems of erosion and to provide means for positively regulating the flow into each corrugate row.

Figure 1:
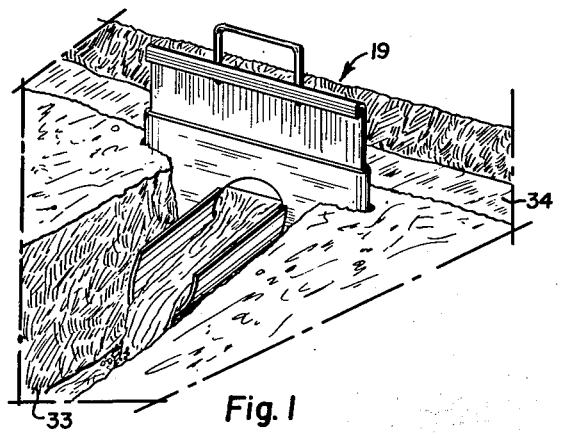
Figure 1 is an isometric view of the present invention formed as a control gate as placed at the head of a trench and receiving water from a ditch lateral.
Figure 2:
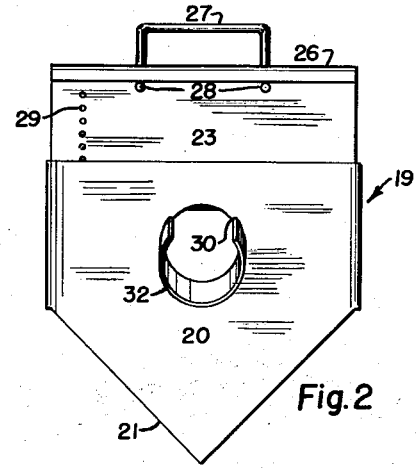
Figure 2 is an elevation of the downstream side of the control gate illustrated at Fig. 1.
Figure 5:
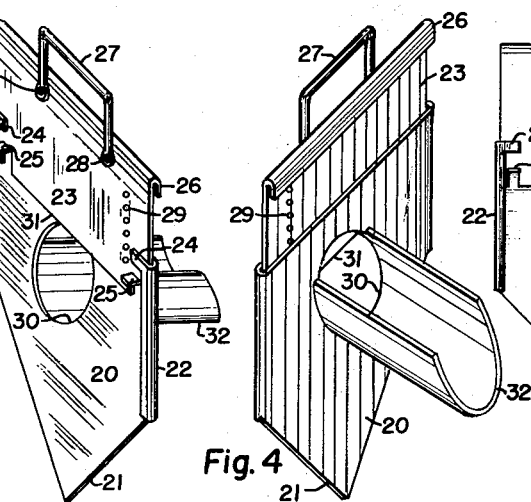
Figure 5 is an isometric view of the control gate illustrated at Fig. 1 as viewed from the upstream side.
Figures 3, 4:
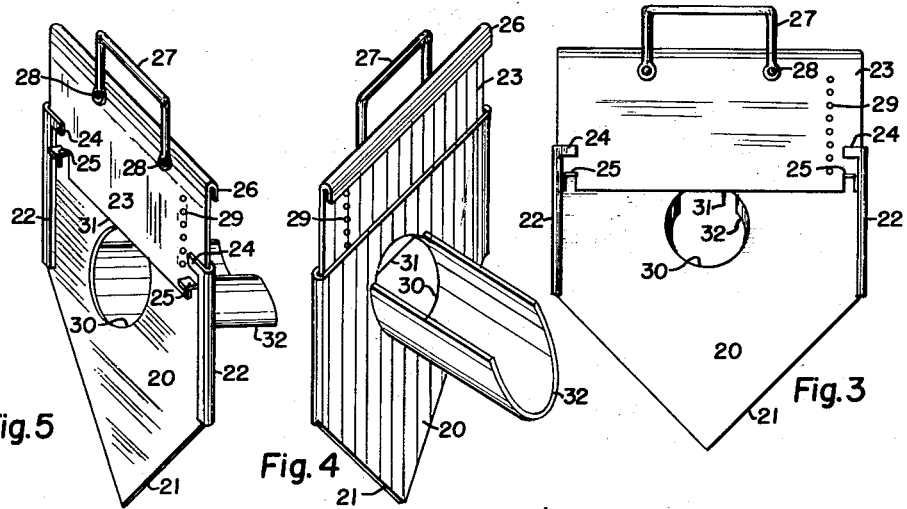
Figure 3 is an elevation of the upstream side of the control gate illustrated at Fig. 1.
Figure 4 is an isometric view of the control gate illustrated at Fig. 1 as viewed from the downstream side.

In one embodiment of my invention a baffle 19 comprises a base plate 20 formed of flat sheet metal or other stiff material having a bottom 21, of triangular or other suitable form to facilitate pushing the base plate 20 into the earth of a ditch row, as illustrated at Fig. 1. The sides of the base plate 20 are crimped to form channeled guides 22 in spaced parallelism to receive a gate 23 formed of a flat rectangular plate whose width permits slidable registration in the guides 22. At the upper edge of the guides 22 there is provided an extension forming a finger 24 at each side of the base plate 20 which is turned inwardly against the gate 23. At the lower edge of the gate 23 there is provided a stop 25, at each side, formed by a tab of metal turned outwardly from the gate lower edge, each stop 25 providing registration with its corresponding finger 24 to limit the upward movement of the gate 23.

The upper edge of the gate 23 is aligned in spaced parallelism with the upper edge of the base plate 20, and a rim 26 is formed by turning the material at the upper edge of the gate 23 toward the base plate in such a manner as to slidably register with and overlap the upper edge of the base plate 20 and thereby provide a reinforcement against buckling whenever the gate is lowered upon the base plate 20 with the rim 26 lapping the upper edge of said base plate. A handle 27, for carrying and lifting purposes, is suitably attached to the gate 23 as by rivets 28, on the side opposite the rim 26, so as not to interfere with movement of the gate onto the base plate. Such rivets 28 have suitably flattened heads on the gate to avoid contact with the base plate 20 during its movements.

The reinforced plate 20 may be pushed into the ground as by applying foot pressure against the rim 26 and the gate 23 may be operatively raised by lifting handle 27, the tenacity of the earth holding the baffle plate in place during the latter movement; also by lifting the gate until the stops 25 register with fingers 24, the entire assembly may be lifted from the earth to remove it. It is anticipated that the inherent frictional resistance between the gate 23 and base plate 20, enhanced by the water pressure against gate 23, will cause any position as set for regulation of flow, to be maintained; however, should it be necessary to fix the height of the gate 23, a plurality of orifices 29 may be provided in the gate whereby a pin placed through a given orifice will rest against the upper edge of the base plate 20.

In the base plate 20 there is provided a flow-orifice 30 centrally disposed whereby it will be completely closed by the gate 23 when it is lowered. It follows that by raising the gate to various positions the opening of the flow-orifice beneath the lower gate lip 31 may be varied to regulate flow through the orifice. At the downstream side of the base plate 20, that is, the side opposite the gate, there is provided an outstanding spout 32 with a slight downward slope. This spout is likewise formed of stiff sheet material and may be attached to the base plate by any conventional means such as welding or riveting. The purpose of this spout is to guide flow from the orifice 30 to a point a reasonable distance from the baffle itself whereby earth adjacent the baffle and holding it in place is not disturbed and a washing out of the baffle will not ordinarily occur.

Figure 6:
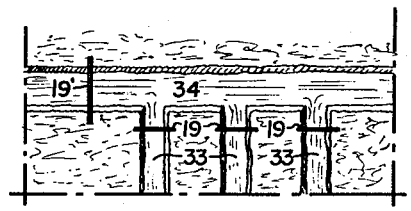
Figure 6 is a diagram illustrating a plurality of gates such as illustrated at Fig. 1 as installed at the head of corrugate rows in a field.

It is apparent from the foregoing description that such a baffle may be of extremely light construction and that a number of them may be brought into a field for irrigation purposes and placed at the head of a series of corrugate rows 33 as illustrated at Fig. 6 whereby flow from a lateral 34 may be apportioned by raising the gates of each individual baffle a given amount. By virtue of the extending spouts the likelihood of any of the baffles washing out is remote and consequently an irrigator may, with such devices, care for and cover a considerably larger tract of land than can ordinarily be done and the irrigator may also work with considerably larger flows than is customary.

Figures 7, 8:
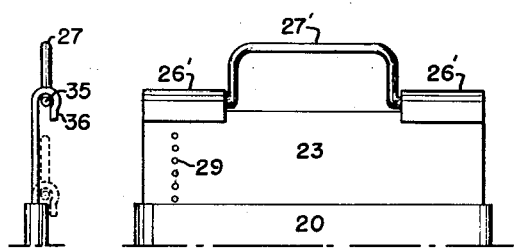
Figure 7 is an elevation view of a portion of a structure similar to the control gate illustrated at Fig. 1, but showing a modification of the handle attached thereto.
Figure 8 is an end view of the structure illustrated at Fig. 7 with broken lines indicating position of the elements illustrated therein with the gate in lowered position.

Figures 7 and 8 illustrate an alternative method of attaching a handle. Here the rim 26' of the gate 23 is segmented to provide two outer portions only with a central gap therebetween. The handle 27' is formed to fit within such gap and is provided with two outstanding arms 35 aligned on a common axis which fits into the rim 26' fold. The rim portions 26', folded over these arms 35, are crimped as at 36 to hold the handle in place with the lower portion of the rim 26', below the crimp, extended to lap the top edge of the base plate 20 for reinforcement as hereinbefore described.

Figure 9:
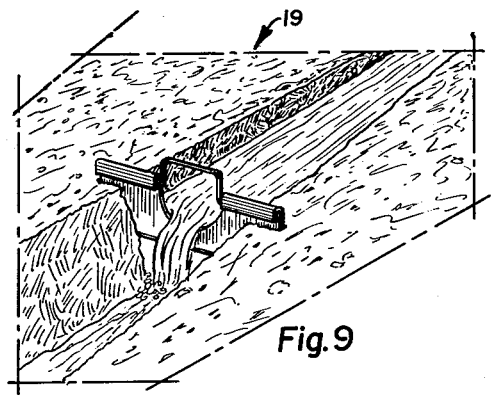
Figure 9 is an isometric view of the present invention formed as a weir as placed in an irrigation lateral.

In an alternate embodiment the baffle may be formed as an overflow weir as illustrated at Figs. 9 to 15. A base plate 20' is provided, and is similar in construction to the base plate 20 having a triangular or otherwise suitably formed bottom 21, upstanding guides 22 at each side, fingers 24 at the tops of these guides, but not having a flow-orifice, the plate being of solid sheet material. The gate 23' is similar to the gate 23 of the Fig. 1 to 7 construction in that it slidably engages the base plate 20' in the guides 22 and is provided with stops 25 to register with fingers 24 to restrict the upward movement of the gate. A handle 27' of the construction illustrated and described at Fig. 7 is necessary for this embodiment. In this gate 23' there is cut a circular segment 37 between the rims 26' which serves as an overflow weir as illustrated at Fig. 9. This weir may be suitably calibrated by markings, shown as numerals 38, to indicate the rate of flow over the weir, for the height of the water surface above the lower edge of the circular segment 37 is directly related to the quantity of flow passing over the weir. The numerals herein illustrated are merely representative and do not indicate any particular calibration because a hydraulician skilled in the art can properly place similar marks and designations to indicate a given flow in cubic feet per second or inches or any other desired unit.

In operation of the baffle 19' as a weir it may be placed in a ditch or lateral in the same manner as hereinbefore described; in placing it in a ditch the gate 23' may be lowered against the baffle plate 20 to permit the rim 26' to reinforce the baffle plate against buckling as it is pushed into the earth. Thereupon the gate 23' may be raised to such an extent that the water level backing up against the baffle is likewise raised to a desired amount and the baffle may be further adjusted so that a definite flow passes through the circular weir-segment 37.

A baffle of this construction acting as a regulating weir is desirable for use in conjunction with a plurality of baffles of the construction hereinbefore described and illustrated at Figs. 1 through 5 because the baffle acting as a weir as illustrated at Figs. 9 to 14 may be placed in a lateral 34 to control the backwater or head of water acting against a plurality of baffles of the type illustrated at Figs. 1 to 6 which are placed at the heads of corrugated rows and are fed from the lateral 34, all as illustrated at Fig. 6.

Figure 12:
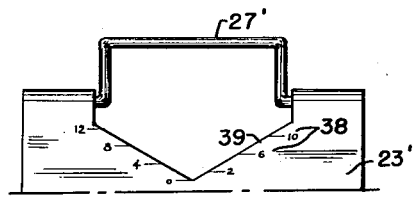
Figure 12 is an elevation view of a portion of a structure such as illustrated at Fig. 10 but showing a modified form of weir opening.
Figure 13:
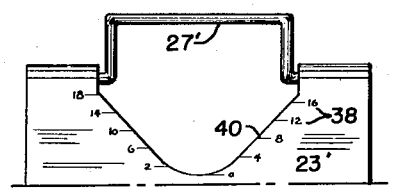
Figure 13 is similar to Fig. 12 but showing yet another modified form of weir opening.
Figure 11:
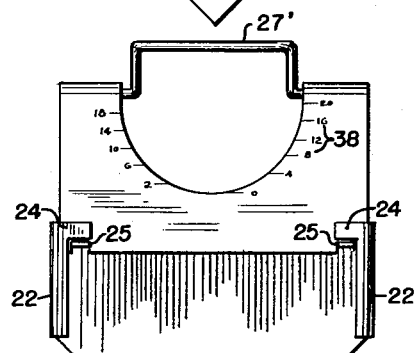
Figure 11 is an elevation of the upstream side of the weir illustrated at Fig. 9.
Figure 14:
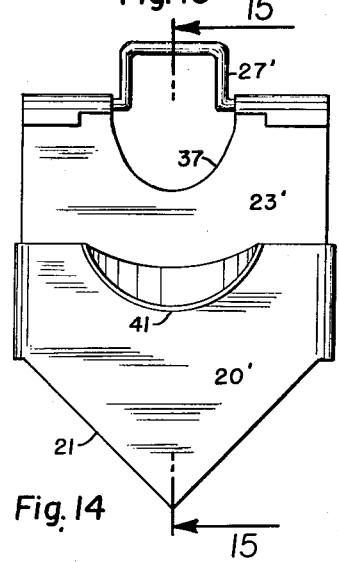
Figure 14 is similar to Fig. 10, illustrating the downstream side of a baffle formed as a weir, but showing further modifications thereon.
Figure 15:
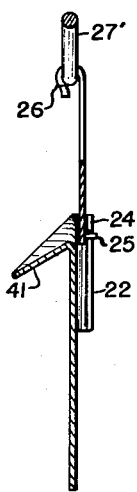
Figure 15 is a section as taken on the indicated line 15—15 at Fig. 14.

Figs. 12 and 13 illustrate further modifications of the weir construction. As illustrated at Fig. 12 a triangular notch 39 is formed in the gate 23' and may be calibrated as by numerals 38 in manner hereinbefore described, the triangular notch 39 being a more conventional form of weir and being more sensitive to correctly measure very small flows. At Fig. 13 there is illustrated a notch 40 essentially parabolic in form and is illustrated to show that various suitable geometric forms may be used to define the weir shape to provide any desired flow characteristic over the weir.

Figure 10:
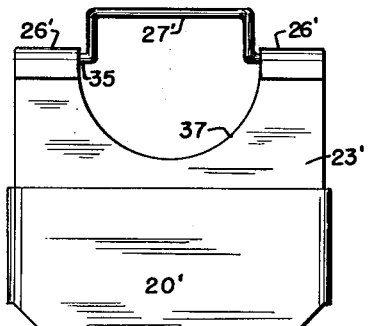
Figure 10 is an elevation of the downstream side of the weir illustrated at Fig. 9.

As a further alternate embodiment of the construction herein described, the baffle 19' may be formed as a weir having a base plate 20', a gate 23', a handle 27' and a notch 37, all as described with reference to the structure illustrated at Fig. 10. However, as a further modification the central portion of the upper edge of the base plate 20' is outwardly turned to provide a lip 41. Water passing over the segment 37 falls onto the lip 41, thereby deflecting the flow outwardly and away from the base of the baffle and to a degree, dissipating the energy of the water falling over the weir, all of this to prevent erosion and washing away of the earth adjacent the baffle and to prevent dislodging the baffle from its position. Such a lip 41, while described herein as being integral and a part of the baffle plate 20', may also be extended in a manner similar to the spout 32 and attached to the baffle plate 20' in any conventional manner.

While I have herein described numerous arrangements and constructions and modifications of my invention it is to be understood that equivalents and alternatives will occur to others skilled in the art and hence I desire to be limited not by the arrangements and constructions described but only by the appended claims.

I claim:

1. A baffle for use in irrigation ditches comprising a base plate of sheet material having its upright outer edges folded inwardly over a common face of the plate to form channel guides in spaced parallelism, a gate of sheet material slidable within said guides and having its top edge folded downward in a 180 degree open fold above the top edge of the base plate on a sharp radius and adapted to lap over and snugly enclose the top edge of the base plate, adjacent both of said guides when the gate is in its lowered position and means for permitting water to flow past the base plate between said guides, said gate being adapted, by its slidability in the guides, to limit the quantity of said flow.

2. An irrigation gate including, in combination, a base plate of a single sheet of material having its bottom portion formed for insertion into the earth responsive to pressure on its top, its upright outer edges being folded inwardly over a common face of the plate forming channel guides in spaced parallelism, and a gate of a single sheet of material slidable within said guides and having its top margin folded downward in an open fold adapted to snugly and slidingly overlap the top edge of the plate, adjacent both of said guides when the gate is lowered, to thereby laterally reinforce the plate and provide a relatively thick and rounded surface for manual downward pressure on the plate.

3. In the organization as defined in claim 2, said means for permitting water to flow past a baffle comprising an orifice within and spaced below the top edge of said base plate.

4. A light weight baffle adapted to be manually pushed into the earth across an irrigation trench, comprising, in combination, a base plate of a single sheet of material having its upright outer edges folded inwardly over a common face of the plate into channeled guides in spaced parallelism, a gate formed of a single piece of sheet material slidable within said guides and upon said face of the plate and having its top margin folded downwardly into a continuous channeled edge adapted to snugly slide over the top edge of the plate when the gate is lowered, whereby said channeled guides on the base plate reinforce the baffle against vertical buckling and said channeled edge on the gate reinforces the baffle against lateral buckling and crimping whenever the gate is at its bottom position and the baffle is being positioned into the earth by pressure on the top edge, and an orifice in the base plate for permitting water to flow through the baffle when the gate is raised.

5. An irrigation gate including, in combination, a base plate of a single sheet of material having its bottom portion formed for insertion into the earth responsive to pressure on its top, its upright outer edges being folded inwardly over a common face of the plate forming channel guides in spaced parallelism, and a gate of a single sheet of material slidable within said guides and having its top margin folded downward in an open fold adapted to snugly and slidingly overlap the top edge of the plate adjacent both of said guides when the gate is lowered, to thereby laterally reinforce the plate and provide a relatively thick and rounded surface for manual downward pressure on the plate, and a notch at the center of the top edge of the gate whereover water may pass.

6. The irrigation gate defined in claim 5 including a finger carried by one of said channel guides and a stop carried by said gate adapted to engage the finger and limit the upward movement of the gate within the base plate.

7. In the organization as defined in claim 5, said notch being provided with markings adjacent thereof whereby to permit a measurement of flow therethrough.

8. In the organization as defined in claim 5, a U-shaped handle positioned above the notch and having lateral extensions from the ends of the handle into the top folded edges of the gate.

9. In the organization as defined in claim 5, a lip at the top edge of the baffle extending outwardly therefrom and thereby adapted to direct water flowing through said notch to a point distant from the base.

References Cited in the file of this patent

UNITED STATES PATENTS

| | | |
|---|---|---|
| 602,973 | Buttorff | Apr. 26, 1898 |
| 704,971 | Campbell | July 15, 1902 |
| 847,160 | Chapman | Mar. 12, 1907 |
| 1,318,656 | FitzGerald | Oct. 14, 1919 |
| 1,379,137 | Syes | May 24, 1921 |
| 1,438,874 | Talbot | Dec. 12, 1922 |
| 1,594,204 | Kingham | July 27, 1926 |
| 1,770,319 | Myers | July 8, 1930 |